United States Patent
Korte et al.

(10) Patent No.: US 7,827,176 B2
(45) Date of Patent: Nov. 2, 2010

(54) METHODS AND SYSTEMS FOR ENDORSING LOCAL SEARCH RESULTS

(75) Inventors: Thomas Christopher Korte, San Francisco, CA (US); Sumit Agarwal, Mountain View, CA (US); Celia Neuhoff Saino, San Francisco, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 10/879,591

(22) Filed: Jun. 30, 2004

(65) Prior Publication Data
US 2006/0004713 A1    Jan. 5, 2006

(51) Int. Cl.
*G06F 7/00* (2006.01)
*G06F 17/30* (2006.01)

(52) U.S. Cl. .................... 707/733; 707/723; 707/731; 707/732

(58) Field of Classification Search ............... 707/723, 707/731, 732, 733
See application file for complete search history.

(56) References Cited

U.S. PATENT DOCUMENTS

| | | | | |
|---|---|---|---|---|
| 6,006,222 | A | 12/1999 | Culliss | 707/5 |
| 6,014,665 | A | 1/2000 | Culliss | 707/5 |
| 6,078,916 | A | 6/2000 | Culliss | 707/5 |
| 6,182,068 | B1 | 1/2001 | Culliss | 707/5 |
| 6,185,559 | B1 | 2/2001 | Brin et al. | 707/6 |
| 6,256,648 | B1 | 7/2001 | Hill et al. | 707/501 |
| 6,266,649 | B1* | 7/2001 | Linden et al. | 705/26 |
| 6,285,999 | B1 | 9/2001 | Page | 707/5 |
| 6,389,372 | B1 | 5/2002 | Glance et al. | 702/189 |
| 6,405,175 | B1* | 6/2002 | Ng | 705/14 |
| 6,526,440 | B1 | 2/2003 | Bharat | 709/219 |
| 6,529,903 | B2 | 3/2003 | Smith et al. | 707/7 |
| 6,594,673 | B1 | 7/2003 | Smith et al. | 707/104.1 |
| 6,615,209 | B1 | 9/2003 | Gomes et al. | 707/5 |
| 6,658,423 | B1 | 12/2003 | Pugh et al. | 707/102 |
| 6,678,681 | B1 | 1/2004 | Brin | 707/6 |
| 6,725,259 | B1 | 4/2004 | Bharat | 709/219 |
| 6,754,873 | B1 | 6/2004 | Law et al. | 715/501 |
| 6,947,924 | B2* | 9/2005 | Bates et al. | 707/3 |
| 2002/0002600 | A1* | 1/2002 | Yamada et al. | 709/219 |

(Continued)

FOREIGN PATENT DOCUMENTS

JP        11265369 A        9/1999

(Continued)

OTHER PUBLICATIONS

Danny Sullivan, "Eurekster Launches Personalized Social Search", Jan. 21, 2004, http://www.searchenginewatch.com.*

(Continued)

*Primary Examiner*—John R. Cottingham
*Assistant Examiner*—Mariela D Reyes
(74) *Attorney, Agent, or Firm*—Fish & Richardson P.C.

(57) ABSTRACT

Methods and systems for improving user search experience with a search engine by providing a way for associated users to create and share personalized lists of local search results and/or advertisements through endorsements of such local search results and/or ads. Local search endorsements can be used to personalize the search engine's ranking of local search results by offering a way for users to re-rank the results for themselves and for those who trust them.

42 Claims, 8 Drawing Sheets

U.S. PATENT DOCUMENTS

| | | | |
|---|---|---|---|
| 2002/0042791 | A1 | 4/2002 | Smith et al. .................... 707/5 |
| 2002/0116466 | A1 | 8/2002 | Trevithick et al. ........... 709/206 |
| 2002/0123988 | A1 | 9/2002 | Dean et al. ...................... 707/3 |
| 2002/0124053 | A1 | 9/2002 | Adams et al. ............... 709/216 |
| 2002/0133481 | A1 | 9/2002 | Smith et al. .................... 707/3 |
| 2003/0050977 | A1 | 3/2003 | Puthenkulam et al. ...... 709/204 |
| 2004/0042599 | A1 | 3/2004 | Zaner et al. ............ 379/144.01 |
| 2004/0059708 | A1 | 3/2004 | Dean et al. ...................... 707/1 |
| 2004/0088325 | A1 | 5/2004 | Elder et al. .............. 707/104.1 |
| 2004/0119740 | A1 | 6/2004 | Chang et al. ................. 345/751 |
| 2004/0122803 | A1 | 6/2004 | Dom et al. ...................... 707/3 |
| 2004/0122811 | A1 | 6/2004 | Page ............................... 707/3 |
| 2005/0120006 | A1* | 6/2005 | Nye ................................ 707/3 |

FOREIGN PATENT DOCUMENTS

| | | |
|---|---|---|
| JP | 2002132604 A | 10/2000 |
| WO | WO 00/68860 | 5/2000 |

OTHER PUBLICATIONS

Danny Sullivan, "Is it really Personalized Search?",May 12, 2004, http://www.searchenginewatch.com.*

Rotten Tomatoes http://web.archive.org/web/20040216095605/www.rottentomatoes.com/m/MonaLisaSmile-1128264/.*

Harper, Phillip, Is Friendster the "Next Big Thing"?, "Why millions are jumping on this online bandwagon" [online], [retrieved on Jul. 29, 2004], 2pp., Retrieved from the Internet: http://mobilemomentum.msn.con/article.aspx?aid=4.

Adamic, L.A., Buyukkokten, Adar E., "A social network caught in the Web", [online], [retrieved on Jul. 28, 2004], 29pp., Retrieved from the Internet: http://firstmonday.org/issues/issue8_6/adamic/.

Doctorrow, C., "Running notes from Revenge of the User: Lessons from Creator/User Battles" [online], [retrieved on Jul. 28, 2004], 5pp., Retrieved from the Internet: http://craphound.com/danahetcon04.txt.

Listings—Tribenet [online], [retrieved Jun. 28, 2004], 2pp., Retrieved from the Internet: http://www.tribe.net/tribe/servlet/template/pub,Listings.vm.

Sullivan, Danny, "Is It Really Personalized Search?", [online] 5pp. [Retrieved on May 13, 2004], Retrieved from the Internet: http://www.searchenginewatch.com.

"Multiply-About Multiply-Help" [online] 2pp. [Retrieved on May 3, 2004], Retrieved from the Internet: http://multiply.com/info/help.

"Multiply-About Multiply" [online] 2pp. [Retrieved on May 3, 2004], Retrieved from the Internet: http://multiply.com/info/about.

"Multiply Terms of Service" [online] 6pp. [Retrieved on May 3, 2004], Retrieved from the Internet: http://multiply.com/info/tos.

"Multiply Privacy Policy" [online] 4pp. [Retrieved on May 3, 2004], Retrieved from the Internet: http://multiply.com/info/privacy.

Sergey Brin and Lawrence Page, "The Anatomy of a Large-Scale Hypertextual Web Search Engine", 20pp., *Computer Science Department*, Stanford University, Stanford, CA, not dated.

"Yelp. Real People. Real Reviews.™", [online] 4pp., [Retrieved on May 31, 2005], Retrieved from the Internet: http://www.yelp.com/.

"Judy's Book Beta Your Friends' Yellow Pages", [online] 2pp., [Retrieved on May 31, 2005], Retrieved from the Internet: http://www.judysbook.com.

"Judy's Book Beta Your Friends Yellow Pages", [online] 5 pp., [Retrieved on May 31, 2005], Retrieved from the Internet: www.judysbook.com.

U.S. Appl. No. 10/879,592, filed Jun. 30, 2004.

* cited by examiner

METHODS AND SYSTEMS FOR ENDORSING LOCAL SEARCH RESULTS

CROSS-REFERENCE TO RELATED APPLICATIONS

This application is related to co-pending U.S. patent application Ser. No. 10/879,592, filed Jun. 30, 2004, entitled, "METHODS AND SYSTEMS FOR ENDORSING SEARCH RESULTS".

BACKGROUND OF THE INVENTION

1. Field of the Invention

The present invention relates generally to methods and systems for searching. For example, embodiments of the present invention relate generally to methods and systems for using member networks to improve a user's search experience with a search engine.

2. Background

A conventional search engine, such as the Google™ search engine, returns a result set in response to a search query submitted by a user. The search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures. For example, the search engine may rank the results based on a popularity score. The search engine generally places the most popular results at the beginning of the result set. Some conventional search engines also include electronic yellow pages to provide searches of individual product/service providers (e.g., restaurants, tax services, auto repair services, etc.) in a particular locality. Such local searches enable users to locate desired product/service providers that do not ordinarily appear in regular searches because they do not have their own websites or URLs.

Conventional websites (also written as "Web sites") such as those hosted on Yahoo!™, Tribe™, Tickle™, or other web sites, allow users to form communities, groups, and/or other member networks. The member networks on conventional websites allow members of the group to communicate with each other and list announcements associated with the community. Generally, conventional web sites do not connect the member networks with search engines and enable members of such networks to endorse or recommend search results, particularly online advertisements and/or search results of local individual product/service providers, to one another.

SUMMARY OF THE INVENTION

Embodiments of the present invention provide methods and systems for members of a member networks to endorse or recommend to other members or users local articles and/or advertisements (hereinafter, "ads") for particular search queries. In one embodiment of the present invention, there is provided a method comprising: receiving endorsement information of endorsed local articles or ads; receiving a local search query; and providing a search result set relevant to the local search query, wherein the search result set includes at least one endorsed article identifier for one of the endorsed local articles or ads.

In another embodiment of the present invention, there is provided a method comprising: receiving a first user profile in a member network created by a first user; receiving a first local search query submitted by the first user; returning from a search engine to the first user a local search result set relevant to the first local search query, the local search result set includes one or more links for endorsing local articles identified in the search result set; receiving from the first user a first endorsement for one of the local articles identified in the local search result set; storing the first endorsement for the local article in a member network database; receiving a second user profile in the member network created by a second user; receiving a second local search query submitted by the second user that is substantially identical or relevant to the first local search query; returning from the search engine a second local search result set relevant to the second local search query; returning from the member network database a third local search result set relevant to the second search query; and merging the second local search result set with the third local search result set to provide the second user with a final local search result set identifying the first endorsement for the second local search query.

The aforementioned embodiments are mentioned not to limit or define the invention, but to provide an example of embodiments of the invention to aid understanding thereof. Such exemplary embodiments are discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures.

DETAILED DESCRIPTION OF THE INVENTION

Overview

Embodiments of the present invention provide methods and systems for members of a member networks to endorse or recommend to other members or users a localized article or articles, which may include individual product/service providers and/or ads for a desired locality. In one embodiment, the method begins with a user signing up to become a member of a member network. After becoming a member, the user can endorse or recommend a local article(s) or ad(s). When an endorsed article identifier appears in a result set relevant to a local search query, the article identifier can have associated endorsement data. Further, as a member, the user can submit local user queries to the search engine and receive lists of search results that include article identifiers of endorsed articles and/or ads from other members of the member network. Each list of article identifiers in a local search result set can be re-ordered or re-ranked to reflect those endorsed article identifiers within the list. Thus, the search endorsements can be used to improve the search engine's ranking of local search results and endorsed ads by offering a way for users to re-rank the local search results and endorsed ads for themselves and for those who trust them.

System Architecture

Figure 1:
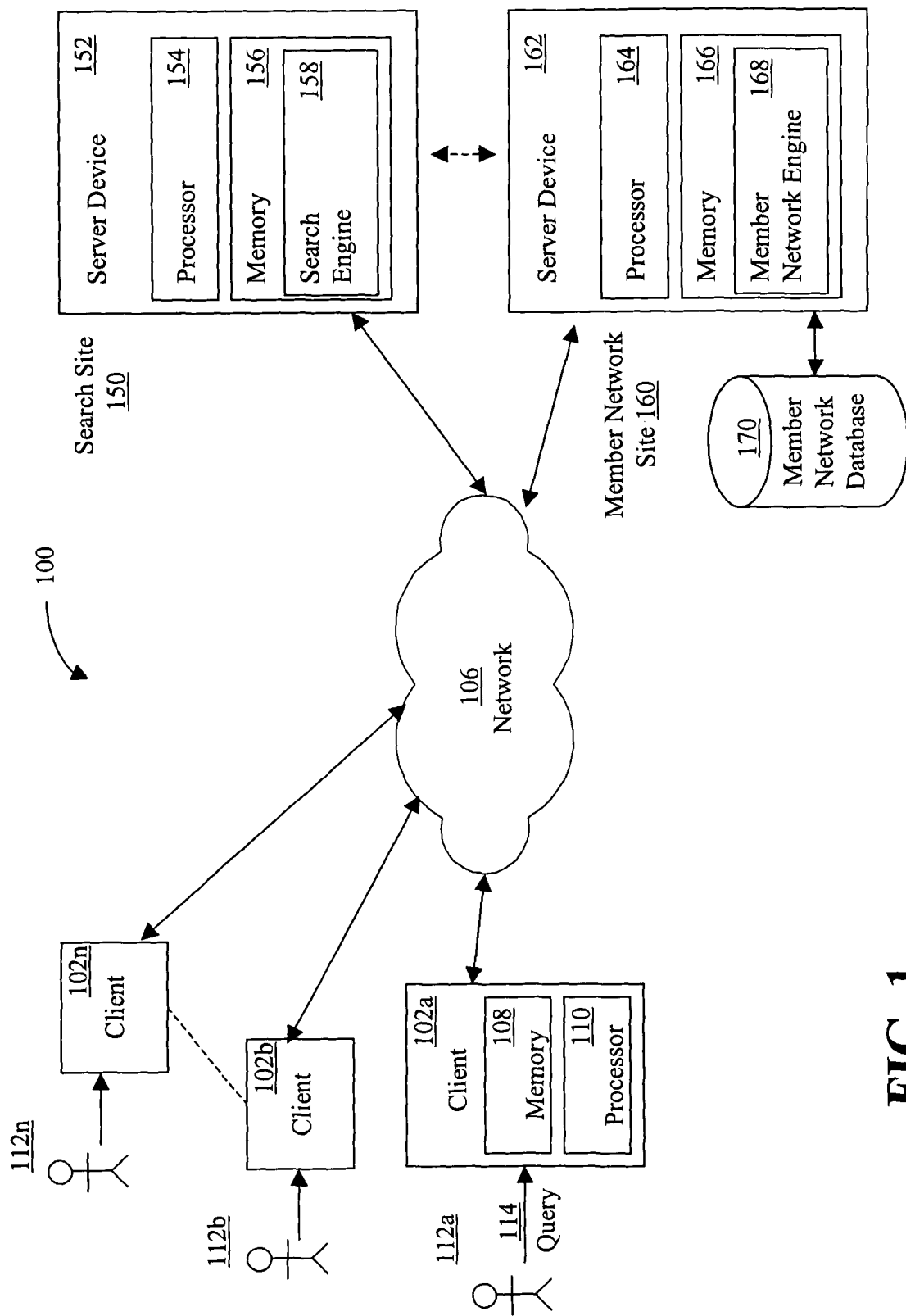
FIG. 1 is a block diagram illustrating an exemplary environment in which embodiments of the present invention may operate.

Various systems in accordance with the present invention may be constructed. FIG. 1 is a block diagram illustrating an exemplary system in which embodiments of the present invention can operate. The present invention may operate, and be embodied, in other systems as well.

Referring now to the drawings in which like numerals indicate like elements throughout the several figures, FIG. 1 is a block diagram illustrating an exemplary system in accordance with an exemplary embodiment of the present invention. The system 100 shown in FIG. 1 includes multiple client devices 102a-n with users 112a-112n in communication with a search site 150 and a member network site 160 over a network 106. The search site 150 and the member network site 160 are also in communication with each other directly (as shown by the dashed line) or through the network 106. The network 106 can be a wired or wireless network. Further, it can be a public network, e.g., the Internet, or a private data network, e.g., a local area network (LAN) or a wide area network (WAN). Moreover, methods according to the present invention may operate within a single computer.

Each of the client devices 102a-n includes a memory 108, which can be a computer-readable medium (CRM), such as a random access memory (RAM), coupled to a processor 110. The processor 110 executes computer-executable program instructions stored in the client device, such as memory 108, as program code. Such processor may include a microprocessor, an ASIC, and state machines. Such processors include, or may be in communication with, media, for example computer-readable media, which stores instructions that, when executed by the processor, cause the processor to perform the methods described herein. Moreover, the processor 110 can be any of a number of computer processors, such as processors from Intel Corporation of Santa Clara, Calif. and Motorola Corporation of Schaumburg, Ill. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may include code from any suitable computer-programming language, including, for example, C, C++, C#, Visual Basic, Java, Python, Perl, and JavaScript.

Client devices 102a-n can also include a number of external or internal devices such as a mouse, a CD-ROM drive, a DVD drive, a keyboard, a display, or other input or output devices. Examples of client devices 102a-n are personal computers, digital assistants, personal digital assistants (PDAs), cellular phones, mobile phones, smart phones, pagers, digital tablets, laptop computers, Internet appliances, and other processor-based devices. In general, the client devices 102a-n can be any type of processor-based platform that operates on any operating system capable of supporting one or more client application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other sites, systems and devices coupled to the network 106. As shown in FIG. 1, a search site 150 and a member network site 160 are also coupled to the network 106.

The search site 150 shown includes a server device 152 executing a search application program, also known as a member network engine 168. The member network engine 168 allows users, such as user 112a, to interact with and participate in a member network. A member network can refer to a computer network connecting entities, such as people or organizations, by a set of social relationships, such as friendship, co-working, or information exchange. Of course, a member network can refer to a computer application or data connecting such entities by such social relationships. Examples of member networks include Orkut.com and Friendster.com.

Member networks can comprise any of a variety of suitable arrangements. An entity or member of a member network can have a profile and that profile can represent the member in the member network. The member network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the member network engine 168 can determine the type of association between member profiles, including, in some embodiments, the degree of separation of the association and the corresponding weight or level of the association.

Similar to the client devices 102a-n, the server device 152 shown includes a processor 154 coupled to a CRM 156. Server device 152, depicted as a single computer system, may be implemented as a network of computer processors. Examples of the server device 162 are servers, mainframe computers, networked computers, a processor-based device, and similar types of systems and devices. The server processor 154 can be any of a number of computer processors, such as processors from Intel Corporation of Santa Clara, Calif. and Motorola Corporation of Schaumburg, Ill.

Memory 156 contains a search application program, also known as a search engine 158. The search engine 158 locates relevant information in response to a search query from one of the client devices 102a-n, e.g., the client device 102a. In the embodiment shown, the server device 152, or related devices, has previously performed a crawl of the network 106 to locate articles, such as web pages, stored at other devices or systems coupled to the network 106, and indexed the articles in an article index for storage in memory 156 or another data storage device. Thus, the search engine 158 can locate relevant information by accessing the article index in response to a search query. The search engine 158 then provides a result set to the client device 102a via the network 106. The result set comprises one or more identifiers of articles that are relevant to the search query. Articles include, for example: word processor, spreadsheet, presentation, e-mail, instant messenger, database, and other client application program content files or groups of files; web pages of various formats (e.g., HTML, XML, XHTML); portable document format (PDF) files; audio files; video files; or any other documents or groups of documents or information of any type whatsoever. An article identifier may be, for example, a uniform resource locator (URL), a uniform resource identifier (URI), a file name, a link, an icon, a path for a local file, or anything else that identifies an article or ad.

The member network site 160 shown includes a member network database 170 and a server device 162 executing a member network engine application program. Similar to the client devices 102a-n, the server device 162 shown includes a processor 164 coupled to a CRM 166. The server device 162 is in communication with a member network database 170. Server device 162, depicted as a single computer system, may be implemented as a network of computer processors. Examples of the server device 162 are servers, mainframe computers, networked computers, a processor-based device, and similar types of systems and devices. The server processor 164 can be any of a number of suitable computer processors, such as processors from Intel Corporation of Santa Clara, Calif. and Motorola Corporation of Schaumburg, Ill.

Memory 166 in the server device 162 contains a member network engine application program, also known as a member network engine 168. The member network engine 168 allows users, such as user 112a, to interact with and participate in a member network. A member network can refer to a computer network connecting people or organization by a set of relationships, such as social relationships like friendship, co-working, or information exchange. A member network can include profiles that can be associated with other profiles. Each profile may represent a member and a member can be, for example, a person, an organization, a business, a corporation, a community, a fictitious person, or other entity. Each profile can contain entries, and each entry can include information associated with a profile. Examples of entries for a person profile can include information regarding relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines, email addresses, location information, IM name, phone number, address, skills, career, or any other information describing, identifying, or otherwise associated with a profile. Entries for a business profile can include market sector, customer base, location, supplier information, net profits, net worth, number of employees, stock performance, or other types of information associated with the business profile.

Additionally, entries within a profile can include associations with other profiles. Associations between profiles within a member network can include, for example, friendships, business relationships, acquaintances, community or group associations, activity partner associations, common interest associations, common characteristic associations, or any other suitable type of relationship connection (e.g., social relationship connection). Associations between profiles can also have various levels. For example, friendship levels can include, for example, a "haven't met" level, an "acquaintance" level, a "friend" level, a "good friend" level, a "best friend" level, and other suitable levels.

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two between profiles A and C. A degree of separation can be type specific or type neutral. Type specific degrees of separation only count relationships of a certain type. Thus, for example, in the case above where A is a friend of B, and B is a friend of C, there is a friendship degree separation of two, even if A is directly associated with C by a business association, which would otherwise produce a degree of separation of 1.

Moreover, each profile can also contain local-search endorsement entries, each entry can include information associated with an endorsed local article. For example, a local-search endorsement entry can include a particular local search query, one or more article identifiers for local articles and/or ads that the user has endorsed for the local search query, and the kind of endorsement for each of the endorsed local endorsed articles and/or ads.

Server device 162 of the member network site 160 also provides access to storage elements, such as a member network storage element, in the example shown in FIG. 1, a member network database 170. The member network database 170 can be used to store profiles of members in a member network and to store communities within the member network as created by the member-network engine 168. Data storage elements may include any one or combination of methods for storing data, including without limitation, arrays, hash tables, lists, and pairs. Other similar types of data storage devices can be accessed by the server device 162. The member network engine 168 can receive data comprising the profiles and communities from the member-network database 170 and can also send data comprising communities and profiles to the member network database 170 for storage. The member-network database 170 may be physically attached or otherwise in communication with the member-network engine 168 by way of a network or other connection.

In operation, upon receiving a search query from a user, such as one of the users 112a-n, the search engine 158 locates relevant information in response to the search query. The search engine 158 then returns a first result set of one or more article identifiers relevant to the search query. The search engine 158 also communicates with the member network engine 168 to access the member network database 170, look up local-search endorsement entries in member profiles that are associated with the user in a member network as further explained later, and return a second result set of one or more endorsed local article identifiers. The two search result sets are then merged to provide the user with a final search result set having article identifiers for local articles and/or ads that are relevant to the search queries, with some article identifiers indicated as having been endorsed based on the second search result set. The final search result set also provides the user with an option to endorse one or more local articles and/or ads in the member profile. The methods for accomplishing these tasks are described below in the process section.

It should be noted that the present invention may include systems having different architecture than that which is shown in FIG. 1. For example, in some systems according to the present invention, server device 162 may include a single physical or logical server. The system 100 shown in FIG. 1 is merely exemplary, and is used to help explain the member networks and methods illustrated in subsequent figures.

Exemplary Member Network

Figure 2:
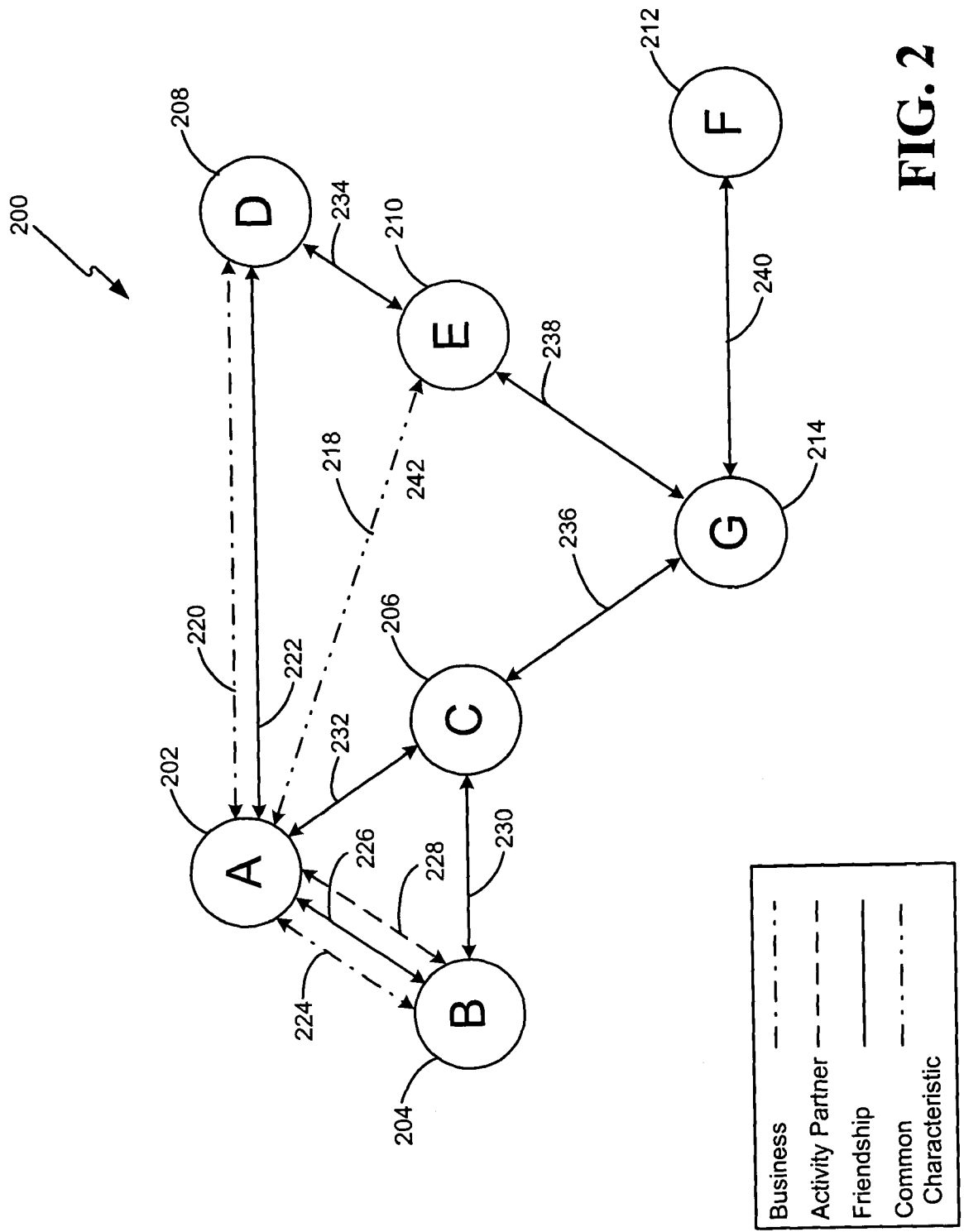
FIG. 2 depicts a diagram of a member network in accordance with an embodiment of the present invention.

FIG. 2 shows a diagram of a member network 200 according to one embodiment of the present invention. According to the embodiment illustrated in FIG. 2, the member network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the member network 200. The exemplary network 200 shown in FIG. 2 has seven members. Considerably more members can be part of the member network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the member network 200 in specific categories, such as humor, intelligence, fashion, trustworthiness, sexiness, and coolness. A member's category ratings can be contained in the member's profile. In one embodiment of the member network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the member network, such as the frequency that the member logs in to the member network and the member's most recent login to the member network. Membership information can also include information about the rate and frequency that a member profile gains associations to other member profiles. In a member network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's member network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other member network members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a member network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the member network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the member network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in member network 200. For example, communities, special interest groups, organizations, political parties, universities, and legal persons, such as corporations and business partnerships may be members of the member network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a member network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum that lower weighted associations.

Process

Various methods or processes in accordance with the present invention may be constructed. For example, in one embodiment, the method begins with receiving profiles of users in a member network, wherein the profiles comprise endorsement information of local articles and/or ads. The endorsement information can include a look-up table listing a category classifying local search queries, an article identifier for an endorsed local article or ad in the category, and an endorsement associated with the article identifier. The endorsements come from members of the member network, and they can be binary endorsements of the local articles and/or ads, ratings of the local articles and/or ads, and/or comments about the local articles and/or ads. Financial incentives can be provided to endorsing users. The method also includes receiving a local search query from a user within or outside of the member network and providing local articles relevant to the local search query, wherein one of the local articles may be endorsed based on the endorsement information. When the received local search query is classified in the same category found in the endorsement information, the provided local article for the received local search query is the endorsed local article listed in the endorsement information. The endorsed local articles and/or ads are from members associated with the user that submits the received local search query. The associations can be based on profile associations indicated in user profiles and/or the received local search query.

Figure 3A:
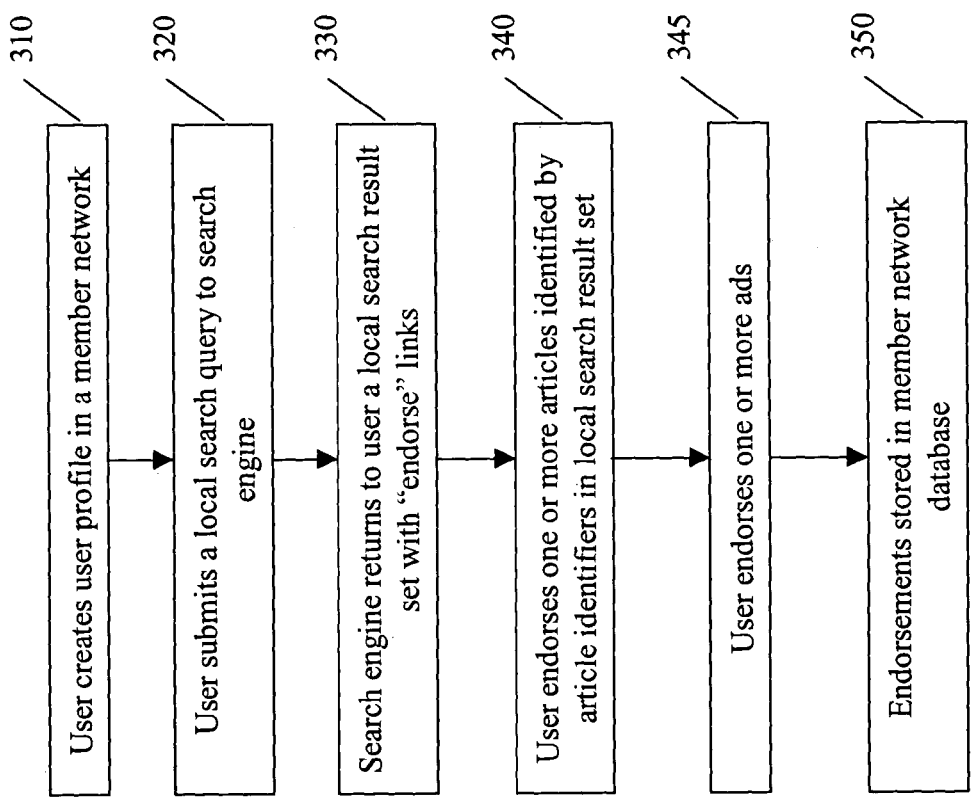
FIGS. 3A-B depict process flows for local search endorsements in accordance with an embodiment of the present invention.
Figure 3B:
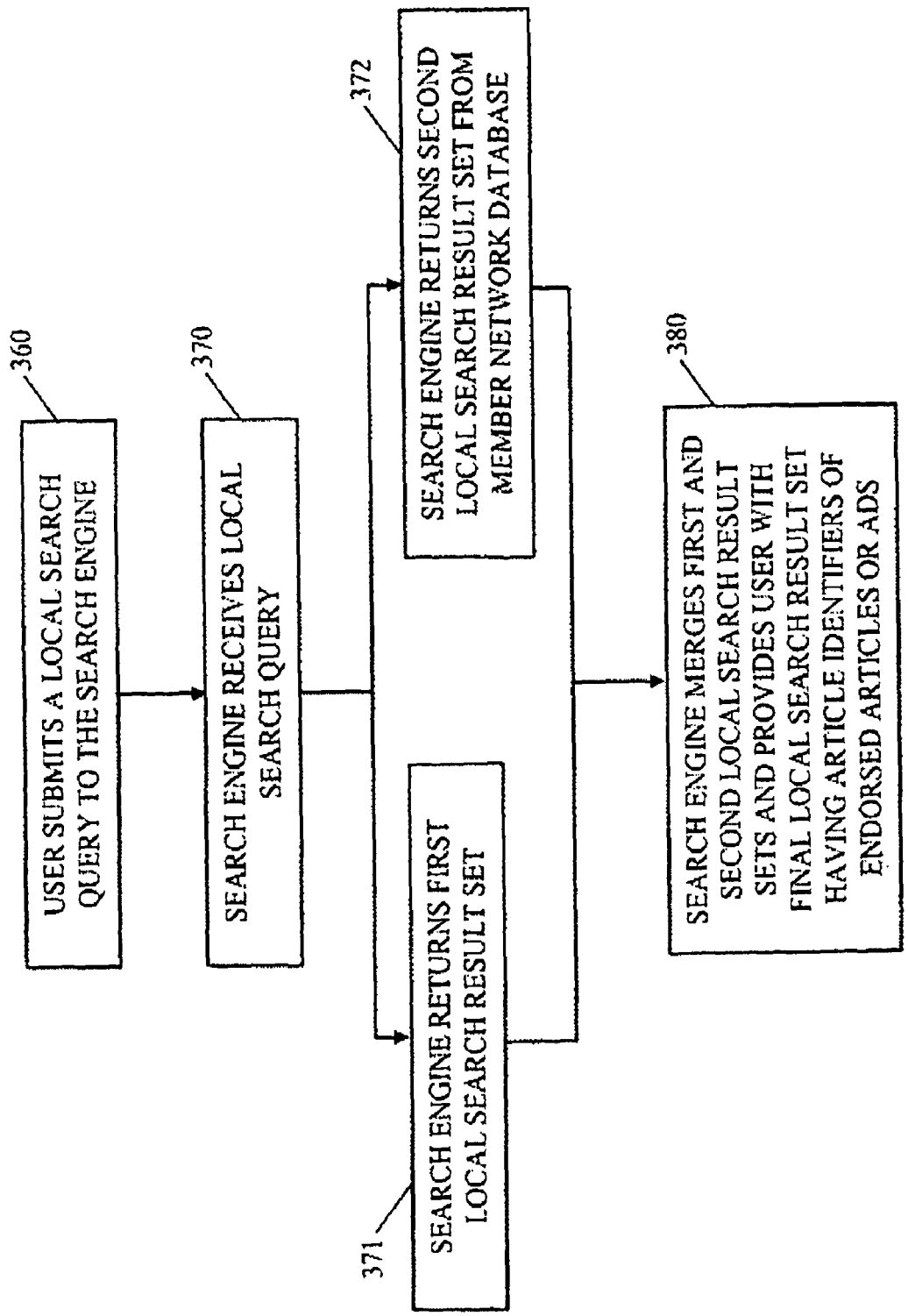

FIGS. 3A-B illustrate an exemplary method that provides local search endorsements whereby members can create and share their personalized lists of local articles and/or ads with other members in the member network and/or other users of a search engine. The exemplary method is provided by way of example, as there are a variety of ways to carry out methods according to the present invention. The method shown in FIGS. 3A-B can be executed or otherwise performed by one or a combination of various systems. The method in FIGS. 3A-B is described below as carried out by the system 100 shown in FIG. 1 by way of example, and various elements of the system 100 are referenced in explaining the example method of FIGS. 3A-B.

The method begins at 310 with a user, such as user 112a, joining a member network, such as the member network 200 (e.g., Orkut™), by creating a user or member profile as described earlier.

At 320, the user 112a submits a local search query to a search engine, such as the search engine 158 at the search site 152, that is linked to the member network site 160. The local search query includes one or more items to be searched (e.g., a sushi restaurant) and a particular locality for the search (e.g., San Francisco). The user 112a submits the local search query by generating a query signal that includes the local search query at the client device 102a and transmitting the query signal to the server device 152 via the network 106.

At 330, in response to receiving the query signal from the client device 102a, the search engine 158 locates the desired local information in a manner know in the art and return article identifiers representing the desired local information in a local search result set. The search engine 158 further categorizes the local search query. For instance, referring to the example of the local search query for a sushi restaurant in San Francisco, such query can be categorized under "Japanese or Sushi Restaurants", and listed under a locality subcategory of "San Francisco". Alternatively, such query can be categorized under the San Francisco locality and listed under a subcategory for "Japanese or Sushi Restaurants". Thus, the types of categorization used for local search queries merely depend on the desire of the search site 150.

Each article identifier in the local search result set returned by the search engine 158 is provided with one or more "endorse" links that enables the user 112a to endorse or recommend the underlying local article represented by the article identifier for the particular issued search query. The endorsement/recommendation can be a simple binary endorsement (e.g., a positive or negative endorsement) of the local article, a scaling system (e.g., 1 to 5 or A to F to indicate best to worst) rating the local article, and/or other added comments about the local article.

At 340, the user 112a can endorse a local article by accessing the respective "endorse" link(s). For instance, the user 112a can click on the "endorse" link and be directed to a navigational page or window, wherein the user 112a is presented with the option to either positively endorse (e.g., "Recommended") or negatively endorse (e.g., "Not Recommended") the local article. In another instance, the user 112a can click on the "endorse" link and be directed to a navigational page or window, wherein the user 112a is presented with a scale, e.g., from 1 to 5 to rate the local article from best to worse or vice versa. In still another instance, separately or in combination with the aforementioned two instances, the user 112a can click on the "endorse" link and be directed to a navigational page or window, wherein the user 112a has the option to add comments about his/her opinion of the local article.

Alternatively, the user 112a can endorse a local article without having to first obtain the local article from a search query. For instance, the user 112a can create a search endorsement entry in his or her member profile, wherein the user 112a can input a desired search query for the endorsement, one or more article identifiers of local articles that the user 112a chooses to endorse for the desired search query, and the kind of endorsement for each of the endorsed local article identifiers.

In a further instance, the user 112a does not click on the available "endorse" link but click on the actual local article identifier to navigate to the actual local article. The search engine 158 then notes such access and transmits that information to the member network site 160 for storage in the profile of the user 112a in the member network database 170. At some point in the future, when the user 112a accesses the search engine 158 for another search, and the search engine 158, communicating with the member network engine 168, links the user 112a with his/her member profile in the member network database 170, the search engine 158 can then prompt the user 112a to endorse the particular local article that the user 112a previously accessed but did not endorse. The user 112a can receive such prompt for endorsement the next time he/she accesses the search engine 158 or after a predetermined number of accesses to the search engine 158. Also, the user 112a may be prompted one or more times as desired. If the user 112a chooses to disregard the prompts, the search engine 158 can stop prompting the user 112a to endorse such local article after a predetermined number of prompts. Subsequently, the search engine 158 can bring up another article identifier for a local article that the user 112a previously accessed but did not endorse and repeat the above prompt process again.

At 345, the user 112a can also endorse any number of ads for a particular local search query in addition to or in lieu of the local articles. As referred herein, an ad can be an online ad, such as a banner ad, a pop-up window ad, or simply a listing of a name of a product/service provider along with contact information. An ad can also be in any format presently known or prospectively contemplated in the art and accessible via its article identifier by the search engine 158 and member network engine 168. According to one embodiment of the present invention, the act of endorsing an ad is separate from the act of accessing the search engine 158 to perform a search as described above. Also, the endorsed ad may or may not contain the same information as one of the local articles that the search engine 158 can come up with for a particular local search query. For instance, prior or subsequent to accessing the search engine 158 for a search, the user 112a may have endorsed an ad through a website that handles such ad. The ad website can then forwards information about the endorsed ad to the member network site 160 so that the member network engine 168 can store the endorsed ad along with the proper local category for the ad in the profile of the user 112a in the member network database 170. The categorization of endorsed ads is similar to that for local articles as described earlier.

At 350, once the user 112a has endorsed one or more local articles as represented by their article identifiers in the local search result set and/or the user 112a has endorsed one or more ads as also represented by their article identifiers, the search engine 158 can communicate with the member network engine 168 to store the endorsements in the member profile in the member network database 170. The endorsements are categorically stored in accordance with the category in which the local search query submitted by the user 112a is listed.

Accordingly, the member profile of the user 112a can include at least the following information: 1) an identifier of the user 112a (who can be anonymous); 2) a list of other users in the member network 200 that have one or more associations with the user 112a as described earlier; 3) a list of categories of local search queries that have local search endorsements; 4) a list of endorsed local articles (e.g., names of a product/service providers and their contact information) and/or ads in each of the categories previously submitted by the user 112a; and/or 5) the endorsements by the user 112a for each of the endorsed local articles and/or ads. Alternatively, the endorsements can include the aforementioned information but be stored in a file other than the member profile and yet be associated with the member.

Referring now to FIG. 3B, at 360, another user, such as user 112b, submits a local search query to the same search site 150. As described earlier with regard to 320, the user 112b submits the local search query at 360 by generating a query signal that includes a local search query at the client device 102b and transmitting the query signal to the server device 152 via the network 106.

In response to receiving the query signal from the client device 102b at 370, the search engine 158 performs two searches: 1) at 371, a regular local search similar to 330 in FIG. 3A whereby the search engine 158 locates the desired local information in a manner know in the art and return article identifiers associated with the local information in a first local search result set; and 2) at 372, a search of the member network database 170 whereby the search engine 158 locates previously endorsed local articles and/or ads in the same category or categories as the local search query submitted by the user 112b in associated member profiles in a member network and return them in a second local search result set. The search engine 158 searches the member network database 170 by first communicating with the server device 162 and its member network engine 168 to identify members in the member network 200 that are associated with the user 112b and/or associated with the local search query submitted by the user 112b. Next, through the member network engine 168, the search engine 158 can access the member profiles of those associated members to look up any available list of endorsed local articles and/or ads (via their article identifiers) in the appropriate one or more categories as described.

Thus, the user 112b can add a layer of trust on top of the regular local search result set. The trust can be in the form of local search endorsements from those members of the member network 200 that are associated with the user 112b because of their explicit profile associations with the user 112b, as described earlier with reference to FIG. 3. The trust can also be in the form of local search endorsements from those members that are associated with the user 112b because of their implicit profile associations with the user 112b and/or the local search query submitted by the user 112b. In one implicit profile association, the search engine 158 and member network engine 168 can identify from member profiles stored in the member network database 170 those members that have the same or similar interests with the user 112b, based on a comparison between the profile of the user 112b and profiles of other users in the member network 200 or a comparison between the profiles of other users in the member network 200 and the local search query submitted by the user 112b. The search engine 158 and member network engine 168 can then provide the user 112b with any local article and/or ad endorsements that are classified in the same category or categories with the local search query submitted by the user 112b from such implicitly-associated members. For instance, if the user 112b is searching for a sushi restaurant in San Francisco, the user 112b can receive endorsements from those members that live in the San Francisco area and like Japanese or sushi restaurant or from those members that are food critics in the San Francisco area. To provide another example, if both the users 112a and 112b are members of a "photography" community within the member network 200, and the user 112b is searching for a digital camera, the user 112b can receive any endorsements from the user 112a and other members of the "photography" community on the kind of digital camera to purchase and/or where to purchase a digital camera. From the present disclosure, one of ordinary skill in the art can see that there are a myriad of criteria that can be used to identify those members that can be implicitly associated with the user 112b. Those criteria merely depend on the extent of the information contained in the member profiles for the member network 200 and the local search queries entered by the user 112b to obtain endorsed local articles and/or ads.

At 380, the search engine 158 then merges the first and second local search result sets together to form a final local search result set. According to one embodiment of the present invention, any endorsed local articles and/or ads in the final search result set can be ranked differently from other local articles in the set and annotated to indicate endorsements. The ranking for each endorsed local article and/or ad can be based on the type and/or degree of associations (implicit or explicit) between the user 112b and the member in the member network 200 that has endorsed such local article and/or ad. For instance, the final search result set is the regular first local search result set that has been re-ordered or re-ranked with article identifiers for the endorsed local articles and/or ads (found from the second local search result set) arranged at the top of the list with annotations to indicate endorsements. The user 112b can then access the annotations to view all endorsements for each endorsed local article and/or ad and identify the user or users that made the endorsements. This allows the user 112b to appropriately trust the endorsements based on his/her associations (implicit or explicit) with the endorsers. The annotations (e.g., "endorsed by John Doe" and/or "from John Doe: a great place for buying widgets") can accompany the article identifier of an endorsed local article or ad and be placed in the vicinity of the article identifier. Alternatively, the annotations can be links to pop-up windows or other sites/pages that contain the endorsement language. According to another embodiment of the present invention, the user 112b can be automatically redirected to the navigational site of an endorsed article or ad based on the ranking or re-ordering.

Figure 6A:
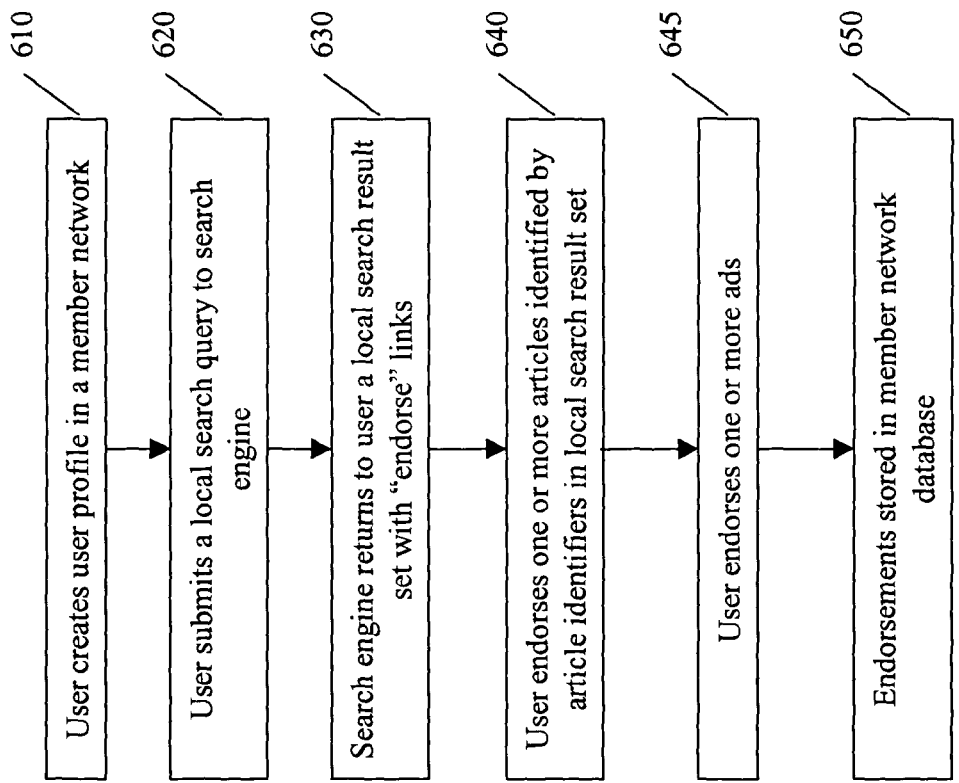
FIGS. 6A-B depict process flows for local search endorsements in accordance with another embodiment of the present invention.
Figure 6B:
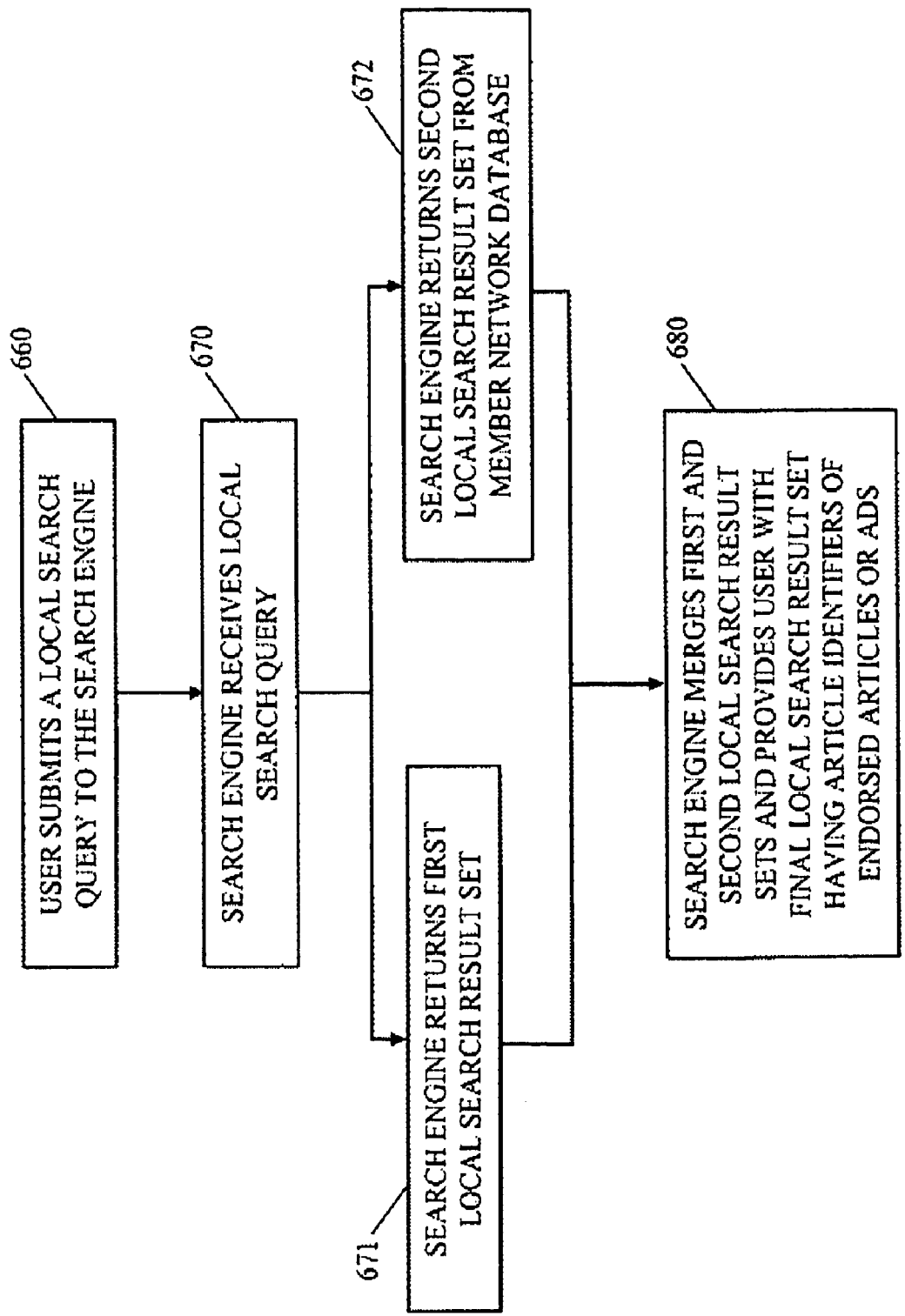

Although the aforementioned embodiments of the present invention have been described with regard to query-dependent endorsements, i.e., endorsed search results are provided based on search queries submitted by a user, it should be understood that query-independent endorsements also can be provided. In an exemplary method that provides query-independent article endorsements, members can create and share their personalized lists of articles with other members in the member network and/or other users of a search engine. The exemplary method is provided by way of example, as there are a variety of ways to carry out methods according to the present invention. The method shown in FIGS. 6A-B can be executed or otherwise performed by one or a combination of various systems. The method in FIGS. 6A-B is described below as carried out by the system 100 shown in FIG. 1 by way of example, and various elements of the system 100 are referenced in explaining the example method of FIGS. 6A-B.

The method begins at 610 and continues at 620 and 630 in a similar manner as described earlier for 310, 320, and 330 in FIG. 3A, respectively.

At 640, similar to 340 in FIG. 3A, the user 112a can endorse a local article by accessing the respective "endorse" link(s). For instance, the user 112a can click on the "endorse" link and be directed to a navigational page or window, wherein the user 112a is presented with the option to either positively endorse (e.g., "Recommended") or negatively endorse (e.g., "Not Recommended") the local article. In another instance, the user 112a can click on the "endorse" link and be directed to a navigational page or window, wherein the user 112a is presented with a scale, e.g., from 1 to 5 to rate the local article from best to worse or vice versa. In still another instance, separately or in combination with the aforementioned two instances, the user 112a can click on the "endorse" link and be directed to a navigational page or window, wherein the user 112a has the option to add comments about his/her opinion of the local article.

Alternatively, the user 112a can endorse a local article without having to first obtain the local article from a search query. For instance, the user 112a can create a search endorsement entry in his or her member profile, wherein, unlike 340 in FIG. 3A, the user 112a does not have to input a desired search query for the endorsement (because the endorsed search result set will be query-independent anyway, although the user 112*a* can still input a desired search query). Here, the user 112*a* also can input one or more article identifiers of local articles that the user 112*a* chooses to endorse, and the kind of endorsement for each of the endorsed local article identifiers.

In a further instance, the user 112*a* does not click on the available "endorse" link but click on the actual local article identifier to navigate to the actual local article. The search engine 158 then notes such access and transmits that information to the member network site 160 for storage in the profile of the user 112*a* in the member network database 170. At some point in the future, when the user 112*a* accesses the search engine 158 for another search, and the search engine 158, communicating with the member network engine 168, links the user 112*a* with his/her member profile in the member network database 170, the search engine 158 can then prompt the user 112*a* to endorse the particular local article that the user 112*a* previously accessed but did not endorse. The user 112*a* can receive such prompt for endorsement the next time he/she accesses the search engine 158 or after a predetermined number of accesses to the search engine 158. Also, the user 112*a* may be prompted one or more times as desired. If the user 112*a* chooses to disregard the prompts, the search engine 158 can stop prompting the user 112*a* to endorse such local article after a predetermined number of prompts. Subsequently, the search engine 158 can bring up another article identifier for a local article that the user 112*a* previously accessed but did not endorse and repeat the above prompt process again.

At 645, similar to 345 in FIG. 3, the user 112*a* can also endorse any number of ads in addition to or in lieu of the local articles. As referred herein, an ad can be an online ad, such as a banner ad, a pop-up window ad, or simply a listing of a name of a product/service provider along with contact information. An ad can also be in any format presently known or prospectively contemplated in the art and accessible via its article identifier by the search engine 158 and member network engine 168. According to one embodiment of the present invention, the act of endorsing an ad is separate from the act of accessing the search engine 158 to perform a search as described above. Also, the endorsed ad may or may not contain the same information as one of the local articles that the search engine 158 can come up with for a particular local search query. For instance, prior or subsequent to accessing the search engine 158 for a search, the user 112*a* may have endorsed an ad through a website that handles such ad. The ad website can then forwards information about the endorsed ad to the member network site 160 so that the member network engine 168 can store the endorsed ad along with the proper local category for the ad in the profile of the user 112*a* in the member network database 170. The categorization of endorsed ads is similar to that for local articles as described earlier.

At 650, similar to 350 in FIG. 3A, once the user 112*a* has endorsed one or more local articles as represented by their article identifiers in the local search result set and/or the user 112*a* has endorsed one or more ads as also represented by their article identifiers, the search engine 158 can communicate with the member network engine 168 to store the endorsements in the member profile in the member network database 170. The endorsements are categorically stored in accordance with the category in which the local search query submitted by the user 112*a* is listed.

Accordingly, the member profile of the user 112*a* can include at least the following information: 1) an identifier of the user 112*a* (who can be anonymous); 2) a list of other users in the member network 200 that have one or more associations with the user 112*a* as described earlier; 3) a list of local categories that have local search endorsements; 4) a list of endorsed local articles (e.g., names of a product/service providers and their contact information) and/or ads in each of the categories previously submitted by the user 112*a*; and/or 5) the endorsements by the user 112*a* for each of the endorsed local articles and/or ads. Alternatively, the endorsements can include the aforementioned information but be stored in a file other than the member profile and yet be associated with the member.

Referring now to FIG. 6B, the method continues at 660, which is similar to 360 in FIG. 3 and described earlier. Next, in response to receiving the query signal from the client device 102*b* at 770, the search engine 158 performs two searches: 1) at 671, a regular local search similar to 330 in FIG. 3A whereby the search engine 158 locates the desired local information in a manner know in the art and return article identifiers associated with the local information in a first local search result set; and 2) at 672, a search of the member network database 170 whereby the search engine 158 locates previously endorsed local articles and/or ads in associated member profiles in a member network and return them in a second local search result set. The search engine 158 searches the member network database 170 by first communicating with the server device 162 and its member network engine 168 to identify members in the member network 200 that are associated with the user 112*b*. Next, through the member network engine 168, the search engine 158 can access the member profiles of those associated members to look up any available list of endorsed local articles and/or ads (via their article identifiers) in the appropriate one or more categories as described for those articles that match with the article identifiers contained in the first search result set.

Thus, the user 112*b* can add a layer of trust on top of the regular local search result set, even though such layer of trust may be query-independent. The trust can be in the form of local search endorsements from those members of the member network 200 that are associated with the user 112*b* because of their explicit profile associations with the user 112*b*, as described earlier with reference to FIG. 2. The trust can also be in the form of local search endorsements from those members that are associated with the user 112*b* because of their implicit profile associations with the user 112*b*. In one implicit profile association, the search engine 158 and member network engine 168 can identify from member profiles stored in the member network database 170 those members that have the same or similar interests with the user 112*b*, based on a comparison between the profile of the user 112*b* and profiles of other users in the member network 200 or a comparison between the profiles of other users in the member network 200 and the local search query submitted by the user 112*b*. The search engine 158 and member network engine 168 can then provide the user 112*b* with any local article and/or ad endorsements that are classified in the same category or categories with the local search query submitted by the user 112*b* from such implicitly-associated members.

To provide an example, if the user 112*b* is searching for a sushi restaurant in San Francisco, the user 112*b* can receive endorsements from those members that live in the San Francisco area and like Japanese or sushi restaurant or from those members that are food critics in the San Francisco area, even though such endorsements contained in the member profiles of those members may not have associated any assigned search queries at all but merely match some of the search results initially returned by the search engine 158. To provide another example, if both the users 112*a* and 112*b* are members of a "photography" community within the member network 200, and the user 112b is searching for a digital camera, the user 112b can receive any endorsements from the user 112a and other members of the "photography" community on the kind of digital camera to purchase and/or where to purchase a digital camera. From the present disclosure, one of ordinary skill in the art can see that there are a myriad of criteria that can be used to identify those members that can be implicitly associated with the user 112b. Those criteria merely depend on the extent of the information contained in the member profiles for the member network 200 as entered by the user 112b to obtain endorsed local articles and/or ads.

At 680, the method continues as described earlier for 380 of FIG. 3.

FIGS. 3A and 6A have been described with reference to one user, namely, user 112a, and FIGS. 3B and 6B have been described with reference to another user, namely, user 112b. However, it should be noted that a plurality of users, including the user 112a or aside from the user 112a, may have endorsed a plurality of local articles and/or ads in the same category or categories of the local search query subsequently submitted by the user 112b. Also, the users 112a and 112b can be one and the same. Hence, according to one embodiment of the present invention, each article identifier in the final search result set described in FIGS. 3B and 6B, regardless of its endorsed or non-endorsed status, can be provided with one or more "endorse" links that enables the user 112b to also endorse and/or recommend the underlying local article or ad for the submitted search query, just as the user 112a is able to do. Further, the user 112b can still benefit from local search endorsements by members of the member network 200 even when the user 112b is not in a member network 200. This is because, as mentioned earlier, the search engine 158 and the member network engine 168 can retrieve endorsements from stored member profiles in the member network database 170 that are implicitly associated with the user 112b based on just the local search query submitted by the user 112b.

Consequently, the local search endorsements can be used to personalize the search engine's ranking of article identifiers in a search result set by offering a way for users to re-rank the article identifiers for themselves and for those associated with them in the member network 200.

According to one embodiment of the present invention, the local search endorsements can provide financial opportunities to both the users who endorse local articles and/or ads and the search site that implements the local search endorsements. For example, to encourage users to endorse a particular article or ad for a particular category, such web site can offer to pay each endorsing user a financial proceed (e.g., a fee for each click through) for the endorsement. The search site can also retain a portion of such proceed.

EXAMPLE

Figure 4:
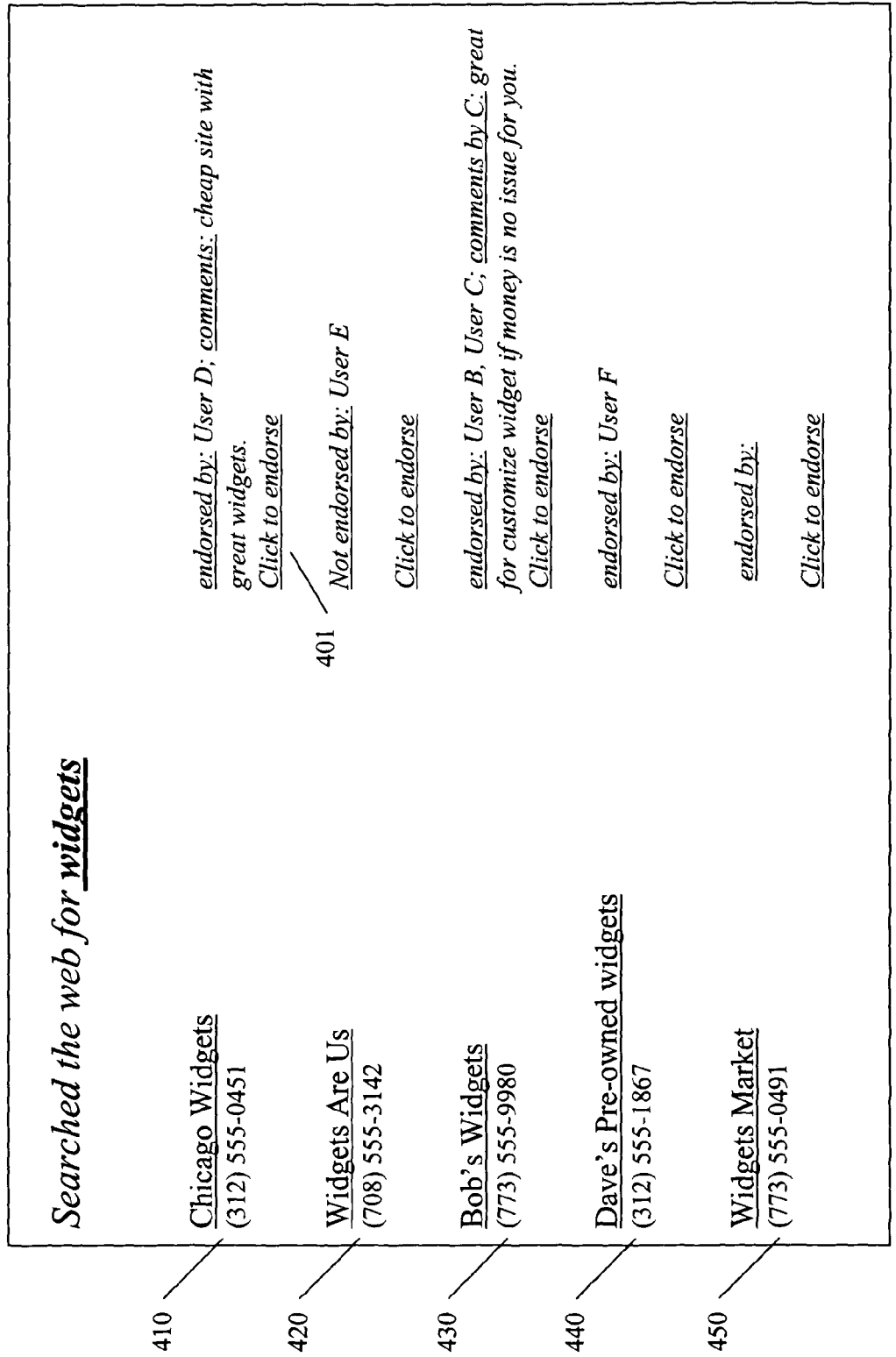
FIG. 4 depicts a sample screenshot of a local articles page in accordance with an embodiment of the present invention.

Referring to the screenshot shown in FIG. 4, with reference to FIGS. 1 and 2, an example in accordance with an embodiment of the present invention is now provided. When a user A (who can be, e.g., any one of the users 112a-n), having a profile A at vertex 202 in FIG. 2 submits, a search query for, e.g., widgets in Chicago, to the search engine 158 at the search site 150, the search engine returns a search result set as shown in FIG. 4 to the user A. As shown, the article identifier 410 indicates an endorsement of the underlying article with a comment by a user D (having profile D at vertex 208 in FIG. 2). The article identifier 520 indicates a negative endorsement by a user E (having profile E at vertex 410 in FIG. 3) with no comments. The article identifier 430 indicates endorsements by users B (having profile B at vertex 204 in FIG. 2) and C (having profile C at vertex 206 in FIG. 2) with comments only from C. The article identifier 440 indicates an endorsement by a user F (having profile F at vertex 212 in FIG. 2) with no comments. The article identifier 450 indicates no endorsements or comments.

From viewing the search results, the user A can decide to: 1) trust the articles represented by article identifiers 410 and 430 because they are endorsed by his/her friends, user B, C, and D (as shown by the friendship associations 226, 32, and 222, respectively); 2) trust the article represented by article identifier 420 a little less because it is endorsed by his/her friend of a friend, user E; and/or 3) not trust the articles represented by article identifier 440 or 450 because article identifier 440 is endorsed by a user F with whom the user A is strenuously associated (a friend F of a friend G of a friend C) and article identifier 450 is not endorsed by anyone. Alternatively, if the user F is implicitly associated with the user A (e.g., the user F is a Widget expert or aficionado in the Chicago area based on his/her user profile, or both users A and F are members of widget community or association within the member network 200), the user A can choose to trust the article represented by article identifier 440. The user A can also trust the article represented by article identifier 430 more than the article represented by article identifier 410 because the user A is associated in more ways with the user B than with the user D (three associations 224, 226, 228 versus two associations 220 and 222, as seen in FIG. 2).

As mentioned earlier, the user A also has an opportunity to provide endorsements and/or comments to one or more of the articles represented by article identifiers 410, 420, 430, 440, and 450 by accessing the link 401 that accompanies each of the article identifiers.

Figure 5:
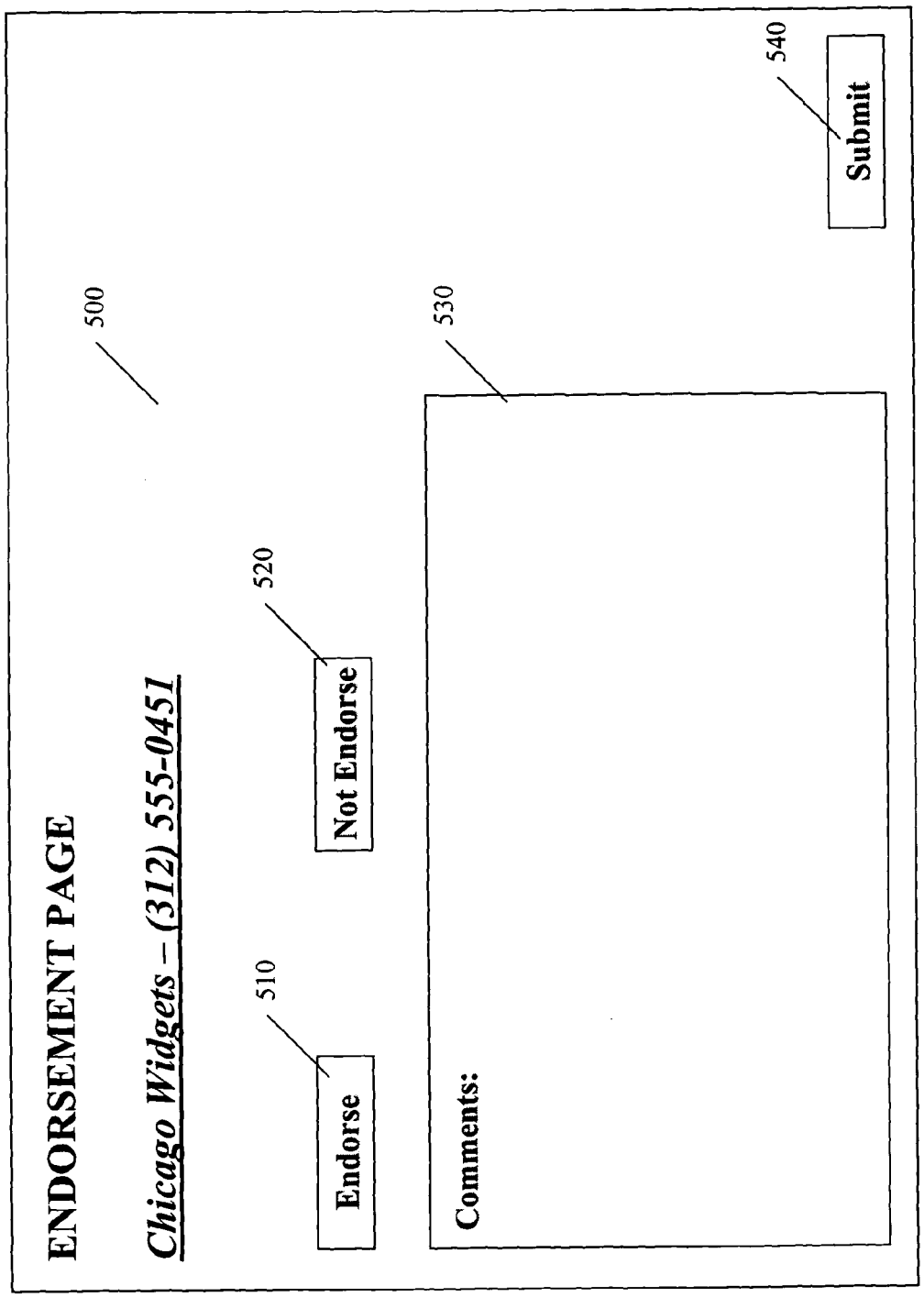
FIG. 5 depicts a sample screenshot of an endorsement page in accordance with an embodiment of the present invention.

FIG. 5 shows a sample screenshot 500 of an endorsement page that is provided when the user A accesses the link 401 of the article identifier 410, in accordance with an embodiment of the present invention. As shown, the user A can positively endorse the link by clicking on button 510, negatively endorse the link by clicking on button 520, and/or add comments in box 530. Once finished, the user A can click on button 540 to end the endorsement process, store the endorsement in his/her user profile in the member network database 170, and return to the search result page shown in FIG. 4. The endorsement by user A will then be added to a search result page in a similar manner to that shown in FIG. 4.

General

Although the invention has been described with reference to these embodiments, other embodiments could be made by those in the art to achieve the same or similar results. Variations and modifications of the present invention will be apparent to one skilled in the art based on the present disclosure, and the present invention encompasses all such modifications and equivalents.

The invention claimed is:

1. A method comprising:
   receiving, at a server that processes digital data, first endorsement information characterizing a first member's rating of a first local product or service provider, wherein the first member is in a member network and is provided with a financial incentive to endorse the first local product or service provider;
   receiving, from a second member in the member network, a local search query comprising information identifying one or more items to be found and a geographic locale to be searched, wherein the local search query is received at the server over a data communication network;
   identifying, using a member network engine available to the server, that there is an association between the first member and the second member, wherein the association comprises an explicit relationship between the first member and the second member or a common membership of the first member and the second member in a community of the member network, wherein the first member is explicitly related to at least one other member in the member network;

ranking items responsive to the local search query based on a type of the association between the second member and the first member in the member network; and responding, over the data communication network, to the local search query with information describing a result set responsive to the local search query, the response set including the ranked items.

2. The method of claim 1, wherein:

receiving the first endorsement information comprises receiving a profile of the first member in the member network; and profiles of members in the member network include endorsement information characterizing the members' rating of local product providers.

3. The method of claim 1, wherein:

receiving the endorsement information comprises receiving a profile of the first member in the member network; and profiles of members in the member network include endorsement information characterizing the members' rating of local service providers.

4. The method of claim 1, wherein receiving the local search query comprises determining the geographical locale of to be searched.

5. The method of claim 1, wherein the first endorsement information comprises:

a category suited for classifying local search queries;

an identifier of the first local product or service provider in the category; and a rating of the first local product or service provider.

6. The method of claim 5, wherein:

the local search query is in the category in the first endorsement information; and the first local product or service provider is in the result set.

7. The method of claim 5, wherein the first member's rating comprises one or more of:

a binary positive or negative rating, a scaled grade, and a comment characterizing the first member's rating of the first local product or service provider.

8. The method of claim 5, wherein the first member's rating comprises one or more of:

a binary positive or negative rating of an advertisement, a scaled grade of the advertisement, and a comment characterizing the first member's rating of the advertisement.

9. The method of claim 1, wherein:

the method further comprises receiving endorsement information characterizing a third member's rating of a second local product or service provider;

the third member is associated with the first member in the member network, wherein the association comprises an explicit relationship between the first member and the third member or a common membership of the first member and the third member in a community of the member network; and the information describing the result set includes at least one identifier personally identifying the third member and indicating that endorsement information characterizing the third member's rating of the second local product or service provider has been received.

10. The method of claim 9, wherein the third member is associated with the first member based on the first member's member profile indicating that the third member is associated with the first member.

11. The method of claim 9, wherein the third member is associated with the first member based on common membership in the community of the member network.

12. The method of claim 9, wherein receiving the endorsement information characterizing the third member's rating comprises receiving the endorsement information from the third member who is provided with a financial incentive to endorse the second local product or service provider.

13. An article comprising one or more computer readable media on which is encoded program code operable to cause one or more machines to perform operations, the operations comprising:

receiving information characterizing explicit relationships between a first member, a second member, and a third member in a member network;

receiving a first search query submitted by the first member;

responding to the first search query with a) first links to a collection of articles in a result set responsive to the first search query, and b) one or more second links for receiving input characterizing the first member's ratings of local product or service providers identified in the result set responsive to the first search query;

receiving the first member's selection of a second link for receiving input characterizing the first member's rating of a first of the local product or service providers identified in the result set;

storing first endorsement information characterizing the first member's rating at a data storage device;

receiving a third search query submitted by the third member;

responding to the third search query with a) third links to a collection of articles in a result set responsive to the third search query, and b) one or more second links for receiving input characterizing the third member's ratings of local product or service providers identified in the result set responsive to the third search query;

receiving the third member's selection of a second link for receiving input characterizing the third member's rating of a second of the local product or service providers identified in the result set;

storing second endorsement information characterizing the third member's rating at a data storage device;

receiving, from a second member in the member network, a local search query comprising information identifying one or more items to be found and a geographic locale to be searched;

determining a result set responsive to the local search query;

identifying that there is an association between the first member and the second member, wherein the association comprises an explicit relationship between the first member and the second member or a common membership of the first member and the second member in a community of the member network, wherein the first member is explicitly related to at least one other member in the member network;

ranking items responsive to the local search query based on a type of the association between the second member and the first member in the member network and on a type of the association between the second member and the third member in the member network; and responding to the local search query with information describing a result set responsive to the local search query, the response set including the ranked items, the identity of the first member, the availability of the first endorsement information, the identity of the third member, and the availability of the second endorsement information.

14. The article of claim 13, wherein:
receiving the first endorsement information comprises receiving a profile of the first member in the member network; and
profiles of members in the member network include endorsement information characterizing the members' rating of local service providers.

15. The article of claim 13, wherein:
receiving the endorsement information comprises receiving a profile of the first member in the member network; and
profiles of members in the member network include endorsement information characterizing the members' rating of local product providers.

16. The article of claim 13, wherein receiving the local search query comprises determining the geographical locale to be searched.

17. The article of claim 13, wherein the first endorsement information comprises:
a category suited for classifying local search queries;
an identifier of the first local product or service provider in the category; and
a rating of the first local product or service provider.

18. The article of claim 17, wherein:
the local search query is in the category in the first endorsement information; and
the first local product or service provider is in the result set.

19. The article of claim 17, wherein the first member's rating comprises one or more of:
a binary positive or negative rating,
a scaled grade, and
a comment characterizing the first member's rating of the first local product or service provider.

20. The article of claim 17, wherein the first member's rating comprises one or more of:
a binary positive or negative rating of an advertisement,
a scaled grade of the advertisement, and
a comment characterizing the first member's rating of the advertisement.

21. The article of claim 13, wherein receiving the endorsement information characterizing the first member's rating comprises receiving the endorsement information from the first member who is provided with a financial incentive to endorse the first local product or service provider.

22. The article of claim 13, wherein:
the method further comprises receiving endorsement information characterizing a third member's rating of a second local product or service provider;
the third member is associated with the first member in the member network, wherein the association comprises an explicit relationship between the first member and the third member or a common membership of the first member and the third member in a community of the member network; and
the information describing the result set includes at least one identifier personally identifying the third member and indicating that endorsement information characterizing the third member's rating of the second local product or service provider has been received.

23. The article of claim 22, wherein the third member is associated with the first member based on the first member's member profile indicating that the third member is associated with the first member.

24. The article of claim 22, wherein the third member is associated with the first member based on common membership in the community of the member network.

25. The article of claim 13, wherein receiving the endorsement information characterizing the third member's rating comprises receiving the endorsement information from the first member who is provided with a financial incentive to endorse the second local product or service provider.

26. A method comprising:
receiving information characterizing explicit relationships between a first member, a second member, and a third member in a member network;
receiving a first search query submitted by the first member;
responding to the first search query with a) first links to a collection of articles in a result set responsive to the first search query, and b) one or more second links for receiving input characterizing the first member's ratings of local product or service providers identified in the result set responsive to the first search query;
receiving the first member's selection of a second link for receiving input characterizing the first member's rating of a first of the local product or service providers identified in the result set;
storing the information characterizing the first member's rating at a data storage device;
receiving a third search query submitted by the third member;
responding to the third search query with a) third links to a collection of articles in a result set responsive to the third search query, and b) one or more second links for receiving input characterizing the third member's ratings of local product or service providers identified in the result set responsive to the third search query;
receiving the third member's selection of a second link for receiving input characterizing the third member's rating of a second of the local product or service providers identified in the result set;
storing the information characterizing the third member's rating at a data storage device;
receiving a local search query submitted by the second member, wherein the second local search query comprises information identifying one or more items to be found and a geographic locale to be searched;
determining a result set responsive to the local search query;
ranking items in the result set based on a degree of the relationship between the first member and the second member and on a degree of the relationship between the third member and the second member; and
based on the relationship between the first member and the second member and on the relationship between the third member and the second member, providing the second member with information describing the second result set, the identity of the first member, the availability of the information characterizing the first member's rating, the identity of the third member, and the availability of the information characterizing the third member's rating.

27. The method of claim 1, wherein the method further comprises:

receiving from the first member information characterizing the first member's rating of an advertisement, and storing the information characterizing the first member's rating of the advertisement in a member network database.

28. The method of claim 1, wherein the first member's rating of the first local product or service provider comprises a scaled grade.

29. The method of claim 1, wherein the first member's rating of the first local product or service provider comprises a comment characterizing the first member's rating of the first local product or service provider.

30. The article of claim 13, wherein the first member's rating of the first local product or service provider comprises a scaled grade.

31. The article of claim 13, wherein the first member's rating of the first local product or service provider comprises a comment characterizing the first member's rating of the first local product or service provider.

32. The method of claim 26, wherein the first member's rating of the first local product or service provider comprises a scaled grade.

33. The method of claim 26, wherein the first member's rating of the first local product or service provider comprises a comment characterizing the first member's rating of the first local product or service provider.

34. The method of claim 1, wherein the identifier personally identifying the first member comprises a name of the first member.

35. The article of claim 13, wherein the identifier personally identifying the first member comprises a name of the first member.

36. The method of claim 1, wherein ranking items responsive to the local search query comprises ranking items based on the degree of association between the second member and the first member.

37. The method of claim 36, further comprising determining the degree of association between the second member and the first member in the member network.

38. The article of claim 13, wherein ranking items responsive to the local search query comprises ranking items based on the degree of association between the second member and the first member.

39. The article of claim 38, wherein the operations further comprise determining the degree of association between the second member and the first member in the member network.

40. The method of claim 26, wherein the operations further comprise determining the degrees of the relationships based on the information characterizing the explicit relationships.

41. The method of claim 1, wherein the information describing the result set includes at least one identifier personally identifying the first member and indicating that endorsement information characterizing the first member's rating of the first local product or service provider has been received.

42. The article of claim 13, wherein the information describing the result set includes at least one identifier personally identifying the first member and indicating that endorsement information characterizing the first member's rating of the first local product or service provider has been received.

* * * * *

UNITED STATES PATENT AND TRADEMARK OFFICE
CERTIFICATE OF CORRECTION

| | | |
|---|---|---|
| PATENT NO. | : 7,827,176 B2 | Page 1 of 1 |
| APPLICATION NO. | : 10/879591 | |
| DATED | : November 2, 2010 | |
| INVENTOR(S) | : Thomas Christopher Korte et al. | |

It is certified that error appears in the above-identified patent and that said Letters Patent is hereby corrected as shown below:

In Claim 4, before "to be" delete "of";

In Claim 13, delete "computer readable" and insert --computer-readable--

Signed and Sealed this
First Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,827,176 B2 | Page 1 of 1 |
| APPLICATION NO. | : 10/879591 | |
| DATED | : November 2, 2010 | |
| INVENTOR(S) | : Thomas Christopher Korte et al. | |

It is certified that error appears in the above-identified patent and that said Letters Patent is hereby corrected as shown below:

In Claim 4, Column 19, line 31, before "to be" delete "of";

In Claim 13, Column 20, line 15, delete "computer readable" and insert --computer-readable--.

This certificate supersedes the Certificate of Correction issued March 1, 2011.

Signed and Sealed this
Twenty-ninth Day of March, 2011

David J. Kappos
*Director of the United States Patent and Trademark Office*